United States Patent
Yue et al.

(10) Patent No.: US 7,347,612 B2
(45) Date of Patent: Mar. 25, 2008

(54) BACKLIGHT MODULE INCORPORATING A NONSPECULAR REFLECTIVE DEVICE

(75) Inventors: Guo-Han Yue, Shenzhen (CN); Wen-Wu Zhu, Shenzhen (CN); Jing Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 41 days.

(21) Appl. No.: 11/287,128

(22) Filed: Nov. 23, 2005

(65) Prior Publication Data
US 2006/0158903 A1     Jul. 20, 2006

(30) Foreign Application Priority Data
Jan. 14, 2005   (TW) ............................... 94101096 A

(51) Int. Cl.
*F21V 7/04* (2006.01)
(52) U.S. Cl. .................... 362/629; 362/600; 362/622
(58) Field of Classification Search ............... 359/34; 349/61; 362/241, 600, 23, 606, 620
See application file for complete search history.

(56) References Cited

U.S. PATENT DOCUMENTS

| 5,567,042 A | * | 10/1996 | Farchmin et al. ........... 362/241 |
| 5,742,368 A | * | 4/1998 | Chen ........................... 349/117 |
| 6,068,381 A | * | 5/2000 | Ayres ......................... 362/633 |
| 6,497,946 B1 | * | 12/2002 | Kretman et al. .......... 428/317.9 |
| 6,750,996 B2 | * | 6/2004 | Jagt et al. ...................... 359/34 |
| 6,791,636 B2 | * | 9/2004 | Paolini et al. ................ 349/61 |
| 6,820,992 B2 | | 11/2004 | Yu et al. |
| 6,908,203 B2 | | 6/2005 | Yu et al. |
| 6,951,401 B2 | * | 10/2005 | Van Hees et al. ........... 362/612 |
| 7,153,017 B2 | * | 12/2006 | Yamashita et al. .......... 362/606 |
| 2004/0125590 A1 | | 7/2004 | Tsai |

FOREIGN PATENT DOCUMENTS

CN         93114517.1         5/1994

* cited by examiner

*Primary Examiner*—Anabel Ton
(74) *Attorney, Agent, or Firm*—Jeffrey T. Knapp

(57) ABSTRACT

A backlight module 200 is provided, which includes a light guide plate 22 and a nonspecular reflective device 28, 34. The light guide plate 22 has a light-incident surface 221, a light-emitting surface 223, and a bottom surface 222 opposite to the light-emitting surface 223. The nonspecular reflective device 28, 34 arranged on and within an elongate section of the bottom surface 222. The elongate section of the bottom surface 222 is proximate to or adjacent the light-incident surface 221 of the light guide plate 22. The backlight module 200 can also include a light source 21 and a reflective plate 23. The light source 21 is disposed facing the light-incident surface 221, and the reflective plate 23 is disposed below the bottom surface 222.

14 Claims, 4 Drawing Sheets

BACKLIGHT MODULE INCORPORATING A NONSPECULAR REFLECTIVE DEVICE

BACKGROUND OF THE INVENTION

1. Field of the Invention

The present invention relates to backlight modules and, more particularly, backlight modules employing reflection control elements.

2. Discussion of Related Art

A liquid crystal material cannot illuminate by itself, so a typical liquid crystal display needs a backlight module to provide a uniform illumination, if sufficient ambient light is not always readily available. The performance of the backlight module mainly depends on a light guide plate employed therein. In operation, light emitted from a light source enters the light guide plate, is ten reflected by a reflective plate, and finally exits from a light-emitting surface of the light guide plate. With the aid of a diffusing plate and a prism plate, the light guide plate can generally provide a uniform luminance.

A typical backlight module includes a light guide plate having a light incident surface, a bottom surface and a light-emitting surface. The backlight module further includes lamps (i.e., a light source) disposed adjacent the light incident surface and a reflective plate disposed under the bottom surface. A diffusing plate and a prism plate are disposed on the light-emitting surface in the order of from bottom to top.

The reflective plate is used for reflecting light beams from the light sources and the light guide plate. The reflective plate typically includes a substrate and a reflective layer formed thereon. The reflective layer can be formed by a coating process. However, when the backlight module is in use, an elongate portion of the light-emitting surface of the light guide plate is generally over-illuminated. As a result, a corresponding elongate region, with a breadth of 3~4 micrometers, of the liquid crystal display screen tends to display an unduly high brightness, thereby impairing the visual effect of the liquid crystal display screen.

Therefore, a heretofore-unaddressed need exists in the industry to address the aforementioned deficiencies and inadequacies associated with light guide plates and the backlight modules using such light guide plates.

SUMMARY OF THE INVENTION

In a preferred embodiment, a light guide plate having a main body is provided. The main body includes a light-incident surface, a light-emitting surface, and a bottom surface opposite to the light-emitting surface. The main body farther includes a nonspecular reflective device arranged upon an elongate section of the bottom surface, the elongate section being a part of the bottom surface and proximate to and/or adjacent the light-incident surface of the light guide plate.

A backlight module is also provided. The backlight module typically includes a light guide plate, a light source, a reflective plate, and a nonspecular reflective device. The light guide plate has a light-incident surface, a light-emitting surface, and a bottom surface. The light source is disposed facing the light-incident surface. The reflective plate is disposed below the bottom surface. The nonspecular reflective device is arranged upon the bottom surface, within an elongate section of the bottom surface. That is, the elongate section is a part of the bottom surface and is proximate to and/or adjacent the light-incident surface.

The elongate section substantially extends to opposite sides of the bottom surface, and the nonspecular reflective device/element substantially covers the elongate section.

A width of the nonspecular reflective device is about 5 to 6 percent of that of the light guide plate, and a length thereof is approximately 70 to 90 percent of that of the light guide plate.

The reflectivity of the nonspecular reflective device is less than that of the reflective plate.

Compared with those available in the conventional art, the light guide plate and the backlight module of the preferred embodiment have the following advantages. The reflectivity of the nonspecular reflective device is less than that of the reflective plate. This difference in reflection not only can eliminate the occurrence of over-illumination on the light guide plate caused by the high reflectivity of the reflective plate but also can help provide a uniform luminance. Furthermore, it brings no undesirable effect on the optical display performance of the backlight module.

BRIEF DESCRIPTION OF THE DRAWINGS

Many aspects of the present light guide plates and the related backlight modules can be better understood with reference to the following drawings. The components in the drawings are not necessarily to scale, emphasis instead being placed upon clearly illustrating the principles of the present light guide plates and the related backlight modules. Moreover, in the drawings, like reference numerals designate corresponding parts throughout the several views.

DETAILED DESCRIPTION OF THE INVENTION

Figure 1:
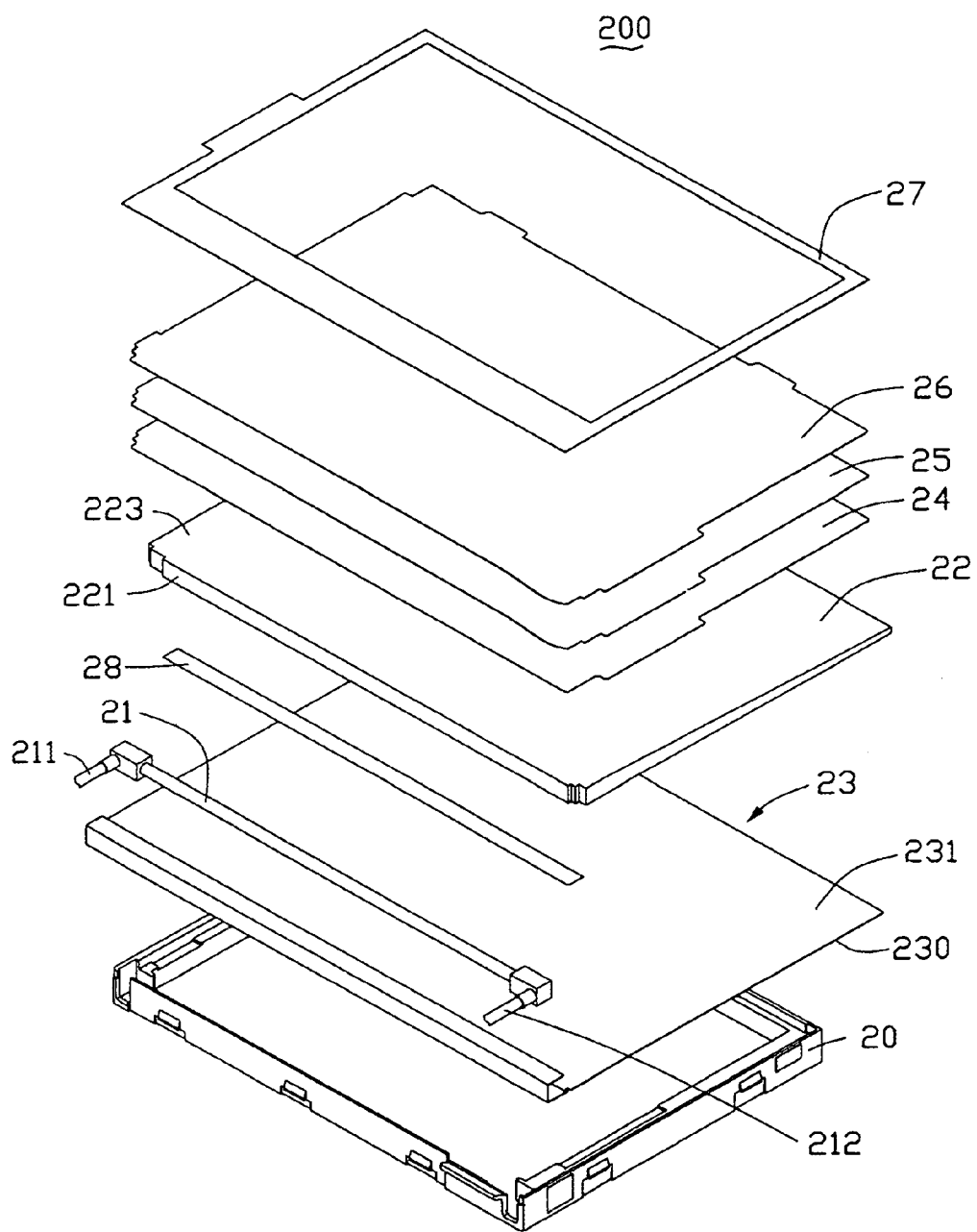
FIG. 1 is an exploded, isometric view of a backlight module, according to a first embodiment, without showing an outer frame.

A backlight module 200 according to a first embodiment is shown in FIG. 1. The backlight module 200 includes a light guide plate 22, a light source 21, a reflective plate 23, and a nonspecular reflective element 28 (also note FIG. 2). The light guide plate 22 further includes a light-incident surface 221, a bottom surface 222 (see FIG. 3), and a light-emitting surface 223. The light source 21 is disposed at the side of the light-incident surface 221 of the light guide plate 22, the light-incident surface 221 respectively adjoining each of the bottom surface 222 and the light-emitting surface 223. The reflective plate 23 is disposed below the bottom surface 222 of the light guide plate 22. The nonspecular reflective element 28 is attached on the bottom surface 222 adjacent and/or proximate the light-incident surface 221 of the light guide plate 22. A diffuser panel 24 is positioned to face the light-emitting surface 223 of the light guide plate 22. A brightness enhancement film (BEF) 25, a dual brightness enhancement film (DBEF) 26 and a light masking film 27 are sequentially formed at a side surface of the diffuser panel 24 that is opposite the side thereof that faces the light guide plate 22. An inner frame 20 is configured for receiving the above-mentioned elements therein.

The light guide plate 22 is advantageously made from polymethyl methacrylate (PMMA), although it is to be understood that the light guide plate 22 could be made from another optical material known to be suitable for use in guide plate applications. Additionally, the light guide plate 22 is a wedge-shaped body or a flat sheet. As regards a wedge-shaped body, a thickness of the light guide plate 22 progressively decreases as the distance from the light-incident surface 221 increases. The light source 21 can be, for example, a cold cathode fluorescent lamp (CCFL) or another compact light source. Two ends of the CCFL are respectively electrically connected to a high-voltage terminal and a low-voltage terminal, by, e.g., a brazing, fusion welding, or press welding method. The light masking film 27 can be made, e.g., of a polyester, for example, poly (ethylene terephthalate). The light masking film 27 is impermeable to light. A side surface of the light masking film 27 that faces the inner frame 27 is adhesively bonded to the inner frame 27. The inner frame 27 can, for example, be made of a plastic material, such as a polycarbonate, poly (ethylene terephthalate), or silicone, etc.

The reflective plate 23 includes a substrate 230 and a reflective layer 231 formed on the substrate. The reflective plate 23 can be made by spreading a high-reflectivity material on the substrate 230. Generally, a high reflectivity means a reflectivity that is above about 70%, or preferably up to approximately 95%. The substrate 230 can be made, e.g., of silver or polyethylene. The reflective layer 231 can, advantageously, be made of one of the following materials: silver, aluminum, or their alloys, or polyethylene terephthalate.

In use, part of the light emitted from the light source 21 enters into the light guide plate 22 and then exits from the light-emitting surface 223 thereof. Another part of the light enters into the light guide plate 22 and exits from a bottom surface 222 thereof. That portion of the light is then reflected back into the light guide plate 22 by the reflective layer 231 of the reflective plate 23 and exits from the light-emitting surface 223 thereof. After passing through the diffuser panel 24, the bright enhancement film (BEF) 25, and the dual brightness enhancement film (DBEF) 26, the light ultimately is incident onto a display panel (not shown).

Figure 2:
FIG. 2 is a cross-sectional view of a nonspecular reflective element of FIG. 1.

Referring to FIG. 2, the nonspecular reflective element 28 is an elongate strip. Nonspecular reflectance is understood to be reflectance other than mirror reflectance. Further, nonspecular reflectance is also known as diffuse reflectance. The elongate strip could be essentially rectangular or could, alternatively, have a narrow elliptic shape. A surface of the reflective element 28 facing the bottom surface 222 of the light guide plate 22 is coated with a glue or adhesive 280. The reflective element 28 is advantageously made of a polyester material. The glue 280 is, for example, made of polystyrene. The glue 280 adheres the reflective element 28 to the bottom surface 222 of the light guide plate 22. A reflectivity of the nonspecular reflective element 28 is generally lower than that of the reflective plate 23. For example, the reflectivity of the nonspecular reflective element 28 is preferably about 50 to about 80 percent of that of the reflective plate 23.

The nonspecular reflective element 28 is sandwiched between the light guide plate 22 and the reflective plate 23. The nonspecular reflective element 28 is positioned on an elongate section 225 of the bottom surface 222 of the light guide plate 22, adjacent or at least proximate the light-incident surface 221 of the light guide plate 22. The nonspecular reflective element 28 is configured to be substantially parallel to the light-incident surface 221 of the light guide plate 22.

Figure 3:
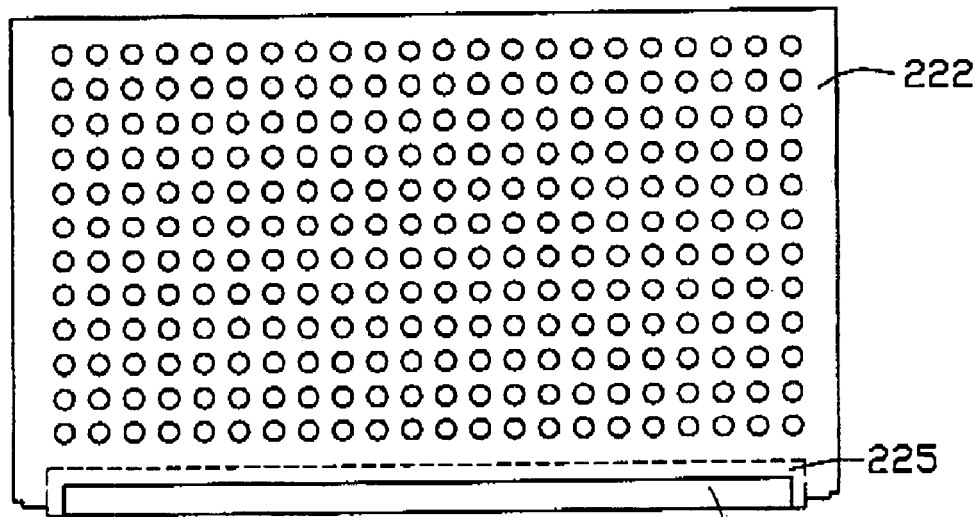
FIG. 3 is a bottom plan view showing the nonspecular reflective element formed on the light guide plate shown in FIG. 1.

FIG. 3 displays the nonspecular reflective element 28 adhered on the bottom surface 222 of the light guide plate 22. A width of the reflective element 28 is configured to be about in the range of 5 to 6 percent of that of the light guide plate 22, and an approximate length thereof is configured to be 70 to 90 percent of that of the light guide plate 22.

In the first preferred embodiment, the reflectivity of the nonspecular reflective element 28 is lower than that of the reflective plate 23, which can eliminate the disadvantage of uneven luminance of the conventional backlight module. In the conventional backlight module, due to the high reflectivity of the reflective plate 23, a portion of the light guide plate 22 that is located adjacent the light source 21 is over-illuminated and thereby has an unduly higher luminance than that of other portions of the light guide plate 22. By the configuration of the nonspecular reflective element 28, the over-illumination is effectively eliminated, and a uniform luminance over the light-emitting surface 223 of the light guide plate 22 is achieved.

Figure 4:
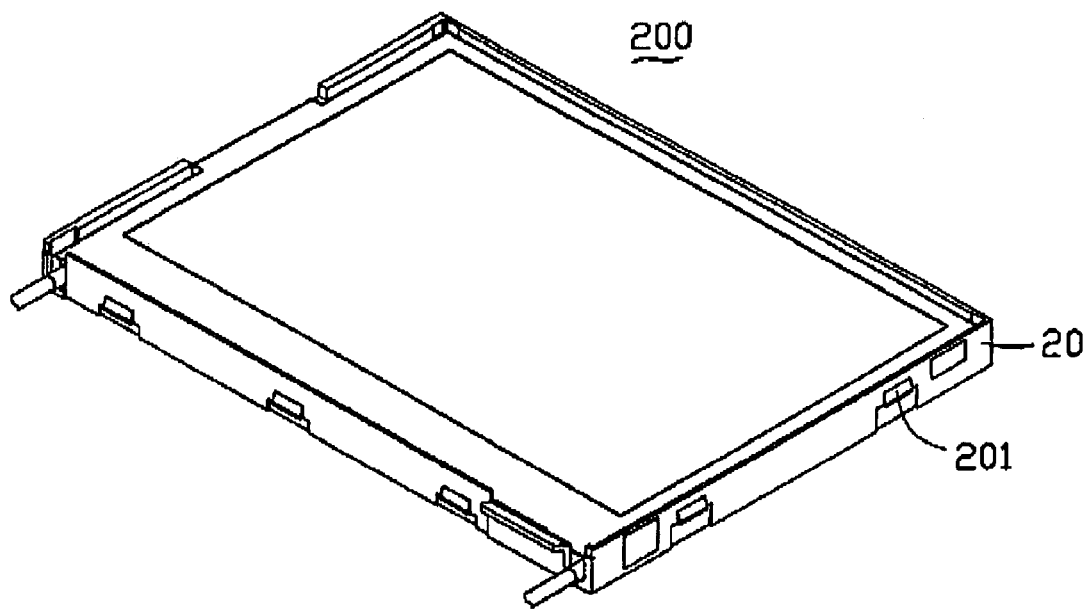
FIG. 4 is an isometric, assembled view of the backlight module of FIG. 1.

Referring to FIG. 4, this illustration shows the partially assembled backlight module 200. The inner frame 20 may be made, e.g., of a material selected from the group consisting of polycarbonate, polyester and silicone. A number of hooks 201 are formed on four sides of the inner frame 20.

Figure 5:
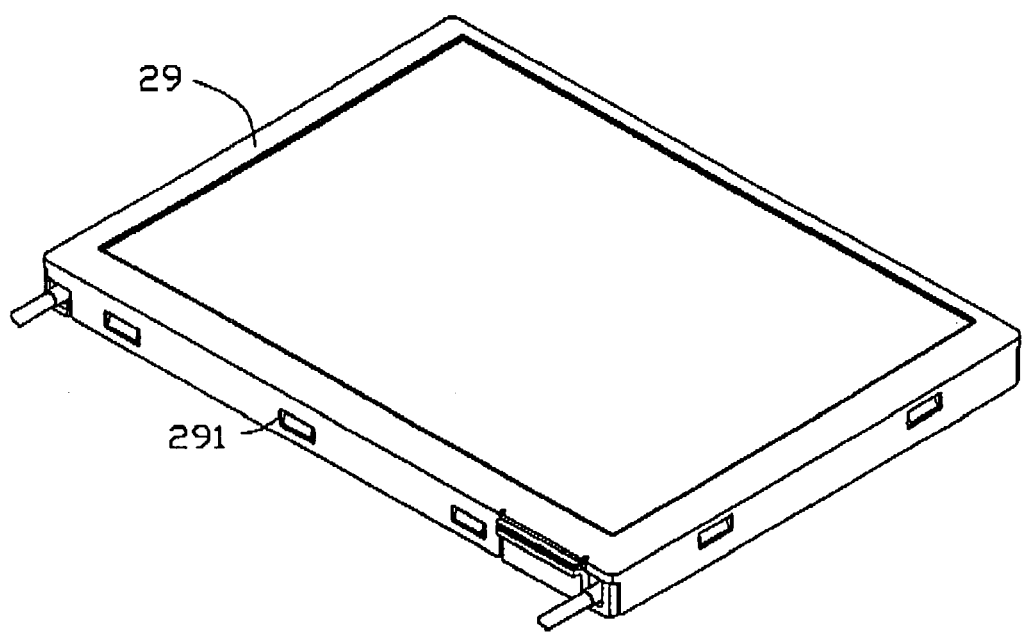
FIG. 5 is an isometric, fully assembled view of the backlight module of FIG. 1, with the outer frame included.

Referring to FIG. 5, this drawing shows the fully assembled backlight module. A number of grooves 291 are defined in four sidewalls of an outer frame 29, such grooves 291 being configured for engagingly receiving the corresponding hooks 201.

In other exemplary embodiments, the backlight module can also be assembled to the outer frame 29 by other means, such as by a bolt-nut structure or another threaded fastener; and/or by a glue or another adhesive.

The outer frame 29 can be made of, e.g., a plastic or a metal, such as iron, aluminum, or an alloy thereof.

Figure 6:
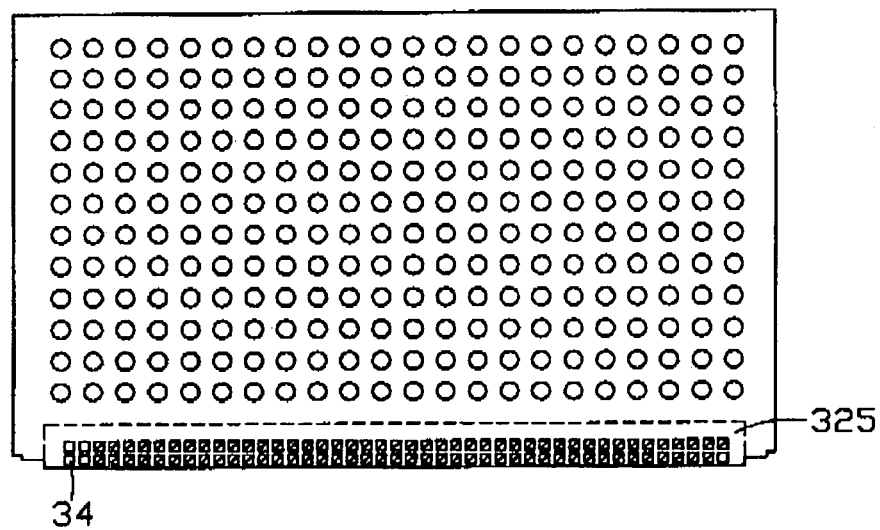
FIG. 6 is a schematic view of a backlight module, according to a second embodiment.

Referring to FIG. 6, a backlight module according to a second embodiment is shown. The second embodiment is substantially the same as the first embodiment, except that the nonspecular reflective element 28 in the first embodiment is replaced wit a number of small-sized, nonspecular reflective units 34. The nonspecular reflective units 34 are regularly arranged on an elongate section 325 of the bottom surface of the light guide plate. In addition, the reflective units 34 are formed in a matrix fashion, and each reflective unit 34 can, e.g., be one of the following shapes: round/spherical, square, heart-shaped, quadrangular or hexagonal. Further, the matrix pattern may be composed of one or more shapes of such reflective units 34.

Figure 7:
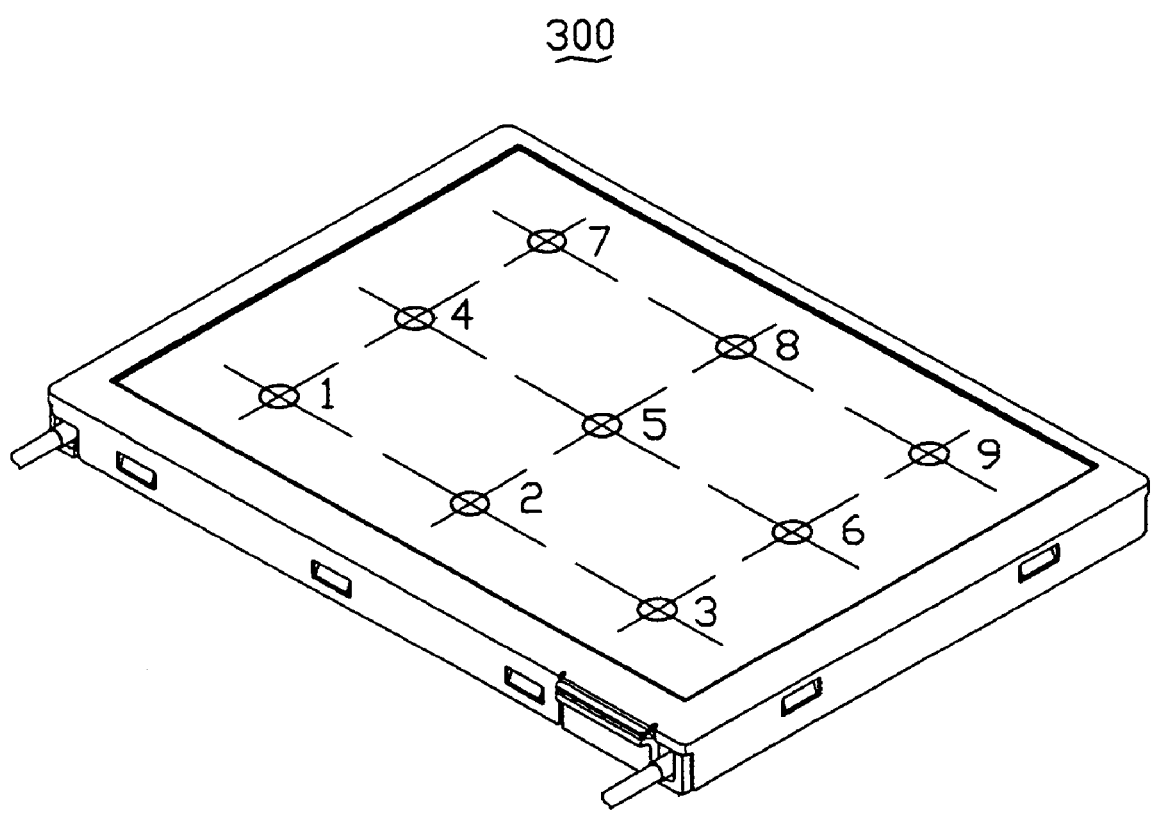
FIG. 7 is an isometric view of a test backlight module, showing locations of testing points on the backlight module, for comparing the present embodiments with conventional embodiments.

Referring to FIG. 7, in order to test whether the nonspecular reflective element 28 can effectively improve the optical display performance of the backlight module 200, a plurality of backlight module test samples 300 (an example one of which is shown in FIG. 7) was prepared. The backlight module test samples 300, overall, included three conventional backlight module testing samples 300 without nonspecular reflective elements and three backlight module testing samples 300, as per the present embodiments, having the nonspecular reflective elements. Nine testing points 1-9 on each of the backlight module test samples 300 are selected for showing the contrastive difference of the optical display performance between the backlight module testing samples 300 with the nonspecular reflective elements and the backlight module testing samples 300 without the nonspecular reflective elements. The testing point 5 is a center point.

The conventional backlight module testing samples without reflective element are identified with S1, S2 and S3 respectively, in the chart/table labeled TAB. 1. The backlight module testing samples having the nonspecular reflective elements, as per the present embodiments, are identified with S4, S5 and S6, respectively, in the chart/table labeled TAB. 2.

TAB. 1 shows the testing results of the backlight module testing samples without nonspecular reflective elements, TAB. 2 shows the backlight module testing samples having the nonspecular reflective elements. In the TABS. 1 and 2, L represents luminance at a given testing point, and x and y together represent a chroma (i.e., vividness of color) coordinate (abbreviated as CC) at a particular testing point.

In TABS. 1 and 2, the testing point 5 is the center point. The testing value of luminance at point 5 is considered the center luminance (abbreviated as CL), which is normally the highest one among all these testing points. AL represents the average value of all the luminance values at these nine testing points. MAX represents the maximum value of the luminance of these nine testing points. MIN represents the minimum value of the luminance of these nine testing points. UD represents the uniformity of luminance of the light guide plate and is defined by the following equation:

$$UD = (MIN/MAX) \times 100\%$$

TABLE 1 testing results of the backlight module samples without the nonspecular reflective elements

| Testing point | Sample | | | | | | | | |
|---|---|---|---|---|---|---|---|---|---|
| | S1 | | | S2 | | | S3 | | |
| | $L(cd/m^2)$ | x | y | $L(cd/m^2)$ | x | y | $L(cd/m^2)$ | x | y |
| 1 | 3846.00 | 0.3008 | 0.3049 | 3924.00 | 0.2974 | 0.3014 | 3860.00 | 0.2979 | 0.3015 |
| 2 | 4671.00 | 0.2993 | 0.3041 | 4664.00 | 0.2965 | 0.3012 | 4521.00 | 0.2968 | 0.3013 |
| 3 | 4101.00 | 0.2988 | 0.3041 | 4023.00 | 0.2960 | 0.3016 | 3824.00 | 0.2970 | 0.3014 |
| 4 | 4187.00 | 0.3013 | 0.3061 | 4126.00 | 0.2982 | 0.3033 | 4163.00 | 0.2986 | 0.3031 |
| 5 | 4540.00 | 0.3005 | 0.3057 | 4425.00 | 0.2979 | 0.3034 | 4516.00 | 0.2984 | 0.3033 |
| 6 | 4604.00 | 0.3004 | 0.3049 | 4285.00 | 0.2975 | 0.3025 | 4436.00 | 0.2988 | 0.3030 |
| 7 | 3917.00 | 0.3026 | 0.3076 | 3792.00 | 0.2996 | 0.3050 | 3851.00 | 0.2999 | 0.3045 |
| 8 | 4205.00 | 0.3026 | 0.3071 | 4001.00 | 0.2996 | 0.3051 | 4100.00 | 0.3003 | 0.3048 |
| 9 | 4422.00 | 0.3021 | 0.3069 | 4054.00 | 0.2995 | 0.3043 | 4247.00 | 0.3002 | 0.3048 |
| AL | 4277.00 | 0.3009 | 0.3057 | 4146.00 | 0.2980 | 0.3031 | 4168.67 | 0.2987 | 0.3031 |
| MIN | 3846.00 | — | — | 3792.00 | — | — | 3824.00 | — | — |
| MAX | 4671.00 | — | — | 4664.00 | — | — | 4521.00 | — | — |
| UD | 82.34% | — | — | 81.30% | — | — | 84.58% | — | — |

TABLE 2 testing results of the backlight module samples having nonspecular reflective elements

| Testing point | Sample | | | | | | | | |
|---|---|---|---|---|---|---|---|---|---|
| | S4 | | | S5 | | | S6 | | |
| | $L(cd/m^2)$ | x | y | $L(cd/m^2)$ | x | y | $L(cd/m^2)$ | x | y |
| 1 | 3753.00 | 0.3048 | 0.3083 | 3639.00 | 0.3043 | 0.3091 | 3724.00 | 0.3035 | 0.3083 |
| 2 | 4498.00 | 0.3037 | 0.3095 | 4361.00 | 0.3039 | 0.3102 | 4390.00 | 0.3022 | 0.3087 |
| 3 | 3724.00 | 0.3037 | 0.3087 | 3687.00 | 0.3049 | 0.3111 | 3760.00 | 0.3023 | 0.3090 |
| 4 | 4106.00 | 0.3050 | 0.3136 | 4098.00 | 0.3046 | 0.3143 | 4129.00 | 0.3034 | 0.3122 |
| 5 | 4400.00 | 0.3043 | 0.3142 | 4402.00 | 0.3041 | 0.3154 | 4570.00 | 0.3030 | 0.3132 |
| 6 | 4205.00 | 0.3043 | 0.3119 | 4225.00 | 0.3048 | 0.3138 | 4321.00 | 0.3029 | 0.3105 |
| 7 | 3782.00 | 0.3060 | 0.3150 | 3836.00 | 0.3059 | 0.3166 | 4011.00 | 0.3053 | 0.3145 |
| 8 | 3884.00 | 0.3060 | 0.3149 | 4012.00 | 0.3057 | 0.3074 | 4197.00 | 0.3047 | 0.3152 |
| 9 | 4039.00 | 0.3054 | 0.3143 | 4139.00 | 0.3059 | 0.3170 | 4363.00 | 0.3048 | 0.3144 |
| AL | 4043.00 | 0.3048 | 0.3123 | 4044.00 | 0.3049 | 0.3139 | 4162.00 | 0.3036 | 0.3118 |
| MIN | 3724.00 | — | — | 3639.00 | — | — | 3724.00 | — | — |
| MAX | 4498.00 | — | — | 4402.00 | — | — | 4570.00 | — | — |
| UD | 82.79% | — | — | 82.67% | — | — | 81.49% | — | — |

TABLE 3

Standard Requirements For Optical Display Performance Of Backlight Module

| | | Standard value | | |
|---|---|---|---|---|
| Item | Description | ST | TYP | Unit |
| CL | Testing point 5 | 4000 | 4300 | cd/m$^2$ |
| AL | Average luminance of 9 points | 3500 | 3700 | cd/m$^2$ |
| UD | 9 points | 75 | 80 | % |
| CC | Chroma coordinate of 9 points | x = 0.30 ± 0.03 | — | |
| | Chroma coordinate of 9 points | y = 0.30 ± 0.03 | — | |

TAB. 3 shows standard requirements for the optical display performance of a backlight module in industry. ST represents the standard minimum value of luminance or average degree; TYP represents the typical value of luminance or average degree. In general, it is acceptable if the luminance or average degree that testing value is greater than the standard minimum value ST, and for the chroma coordinate, it is acceptable when it is within the scope of 0.30±0.03.

Comparing the testing results shown in TAB. 2 with the standard requirement for the optical display effect shown in TAB. 3, it can be concluded that the values of center luminance (CL), average luminance (AL) and/or uniformity degree (UD) are higher than the standard minimum value (ST), thereby indicating that the testing results meet the standard requirements. In comparison between the data of TAB. 1 and TAB. 2, we can find that luminance or uniformity degree has little change with and without the nonspecular reflective element, or the change is acceptable according to TAB. 3. It means the usage of reflective element doesn't cause any unacceptable affect on the luminance or uniformity of backlight module.

Furthermore, comparing the luminance at point 2 with that at other points of the same sample, especially with that at point 5 in TABS. 1 and 2, we can see that, in TAB. 1, the luminance at point 2 is obviously higher than that at other points, especially higher than that at point 5 which should be normally the highest one among all these testing points. That data shows that at point 2 there is over-illumination. While in TAB. 2, the luminance at point 2 becomes lower and is particularly lower than that at point 5, on the whole. The comparison shows that the test devices 300 incorporating nonspecular reflective devices have overcome the over-illumination phenomenon and help provide a uniform luminance for each sample.

Chroma coordinate value is in the range of 0.30±0.03, and each chroma value also has little change by using the reflective elements.

All in all, the nonspecular reflective device not only can eliminate occurrence of over-illumination on the light guide plate but also can help provide a uniform luminance. In looking at the AL statistics from TABS. 1 and 2, it can be seen that, on average, the AL associated with the test devices 300 incorporating nonspecular reflective devices were less than that of the test devices 300 not incorporating nonspecular reflective devices. These statistics support the notion that a nonspecular reflective device could be employed in a specific location to decrease reflection in that particular zone or region. It is this average decrease in reflection that utilized to overcome what had otherwise been an abnormally bright zone in the resulting display. Furthermore, it brings no undesirable effect on the optical display performance of the backlight module.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
    a light guide plate comprising;
    a light-incident surface;
    a light-emitting surface; and
    a bottom surface opposite to the light-emitting surface, the bottom surface having an elongate section that is a part of the bottom surface, the elongate section of the bottom surface being aligned substantially parallel to the light-incident surface, the elongate section of the bottom surface further being proximate or adjacent the light-incident surface; and
    a nonspecular reflective device arranged on the bottom surface of the light guide plate, the nonspecular reflective device occupying the elongate section of the bottom surface.

2. A backlight module as claimed in claim 1, wherein the elongate section of the bottom surface substantially extends to opposite sides of the bottom surface, and the nonspecular reflective element substantially covers the elongate section.

3. A backlight module as claimed in claim 1, wherein the nonspecular reflective device is comprised of a material different from that of the main body of the light guide plate.

4. A backlight module as claimed in claim 1, further comprising a reflective plate disposed below the bottom surface, the nonspecular reflective device being diffusively reflective, the reflective plate having a higher reflectivity associated therewith than the nonspecular reflective device.

5. A backlight module comprising:
    a light guide plate, having a light-incident surface, a light-emitting surface and a bottom surface, the bottom surface including an elongate section, the elongate section being a part of the bottom surface and proximate or adjacent the light-incident surface;
    a light source disposed facing the light-incident surface;
    a reflective plate disposed below the bottom surface; and
    a nonspecular reflective device arranged on the bottom surface within the elongate section thereof.

6. A backlight module as claimed in claim 5, wherein a width of the nonspecular reflective device is about in the range of 5 to 6 percent of that of the light guide plate, and an approximate length thereof is 70 to 90 percent of that of the light guide plate.

7. A backlight module as claimed in claim 5, wherein a reflectivity of the nonspecular reflective device is less than that of the reflective plate.

8. A backlight module as claimed in claim 7, wherein a reflectivity of the nonspecular reflective device is about 50 to about 80 percent of that of the reflective plate.

9. A backlight module as claimed in claim 5, wherein the nonspecular reflective device is comprised of polyester.

10. A backlight module as claimed in claim 5, wherein the nonspecular reflective device is adhesively attached to the light guide plate.

11. A backlight module as claimed in claim 10, wherein a glue is used to adhesively attach the nonspecular reflective device to the light guide plate, the glue being comprised of polystyrene.

12. A backlight module as claimed in claim 5, wherein the reflective plate comprises a substrate and a reflective layer formed thereon.

13. A backlight module as claimed in claim 12, wherein the reflective layer is comprised of a material selected from a group consisting of: silver, aluminum, an alloy including at least one of silver and aluminum, and polyethylene terephthalate.

14. A backlight module as claimed in claim 5, wherein the nonspecular reflective device is in the form of one of a nonspecular reflective strip and an array of nonspecular reflective shapes.

\* \* \* \* \*